United States Patent

[11] 3,581,649

| [72] | Inventor | George W. Rauenhorst<br>Olivia, Minn. 56277 |
|---|---|---|
| [21] | Appl. No. | 815,621 |
| [22] | Filed | Apr. 14, 1969 |
| [45] | Patented | June 1, 1971 |

[54] SOLAR HEATING AIR CHANGING WALL STRUCTURE
9 Claims, 6 Drawing Figs.

[52] U.S. Cl. .................................................. 98/33, 165/66
[51] Int. Cl. ..................................................... F24f 13/00
[50] Field of Search ........................................ 165/66; 98/31, 32, 33, 33 R

[56] References Cited
UNITED STATES PATENTS

| 2,019,351 | 10/1935 | Lathrop .................... | 165/66 |
| 2,488,333 | 11/1949 | Schlachter ................. | 165/66 |
| 2,825,210 | 3/1958 | Carr .......................... | 165/66 |

*Primary Examiner* — William J. Wye
*Attorney* — Williamson, Palmatier and Bains

ABSTRACT: A wall structure of a building in which heat is exchanged between exhaust air and intake air.

Patented June 1, 1971

INVENTOR.
GEORGE W. RAUENHORST
BY Williamson, Palmatier
& Bains
ATTORNEYS

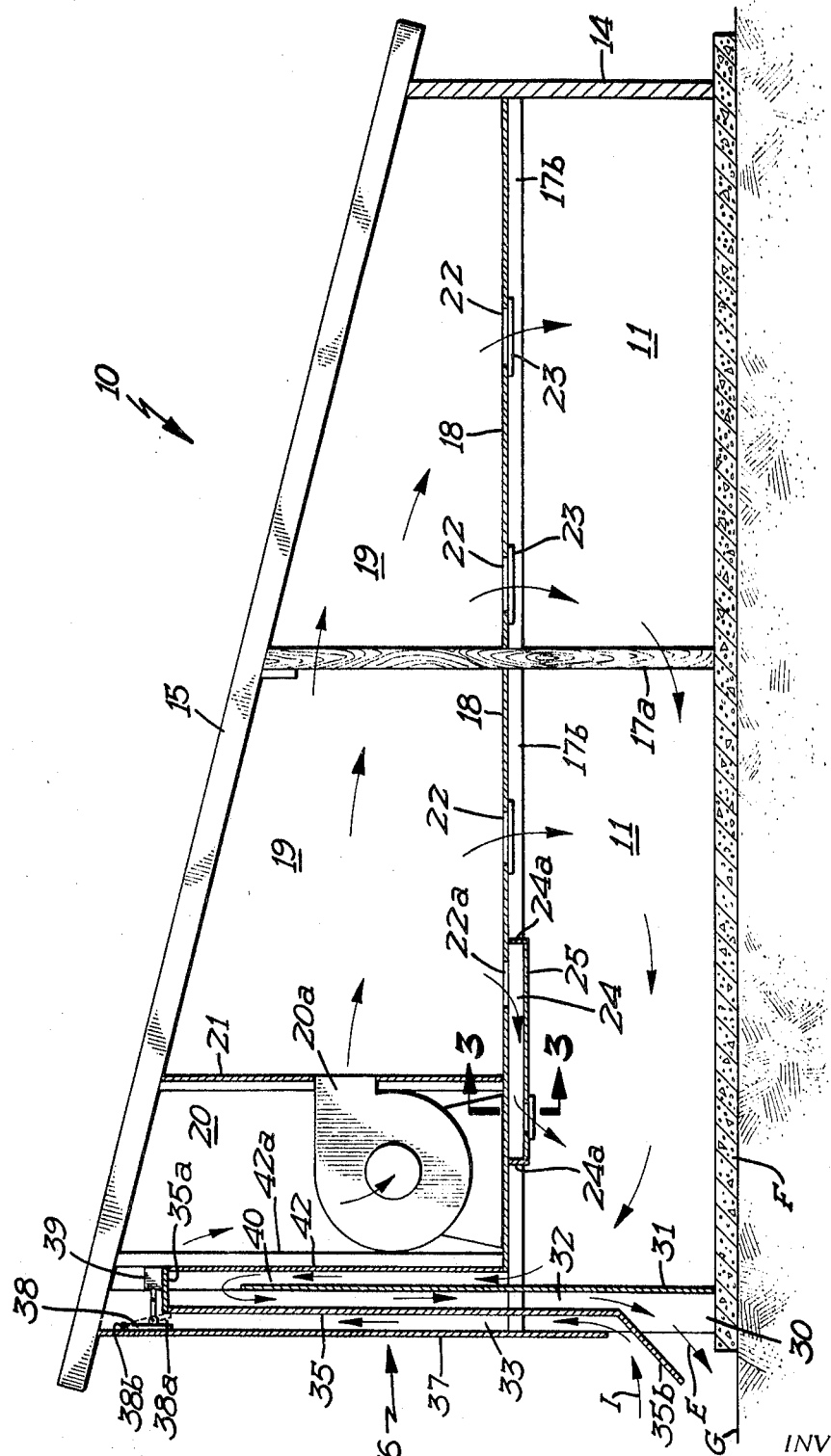

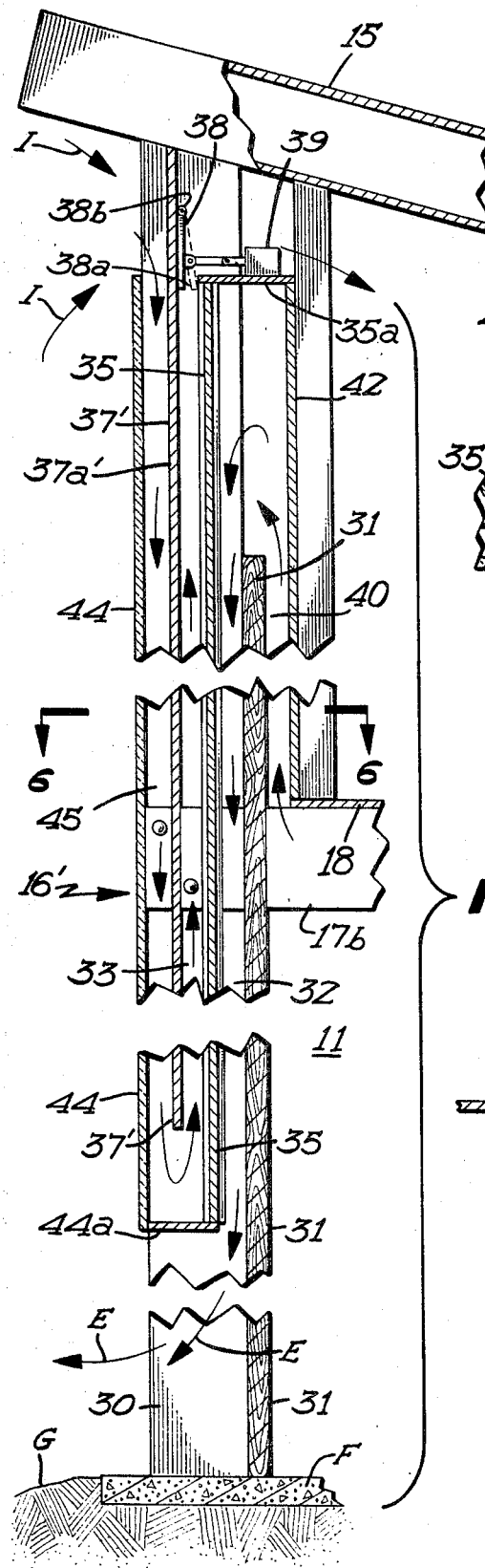
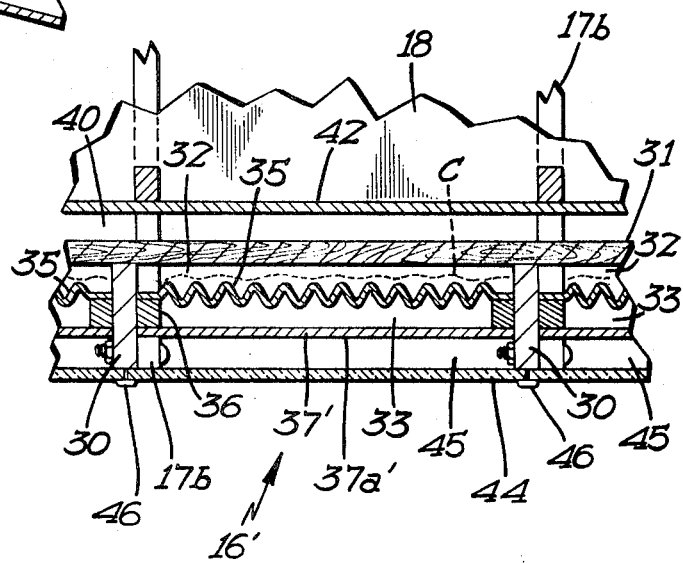
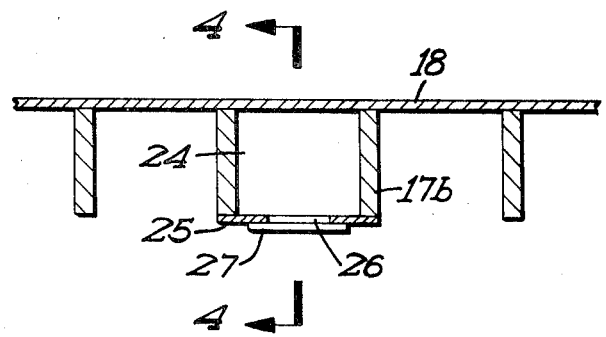
FIG 5
FIG 6
FIG 3
INVENTOR.
GEORGE W. RAUENHORST
BY
Williamson, Palmatier
& Bains
ATTORNEYS

SOLAR HEATING AIR CHANGING WALL STRUCTURE

In numerous types of buildings, it is very desirable to change the entire air in the whole building or in one section of the building many times in each hour. In changing the air within a building there is some loss of heat due to the exhausting of heated air. It has been considered a prohibitive expense in operating a building to lose vast amounts of heat in the exhaust air.

Obviously, there are numerous advantages to changing the air in a building many times per hour. For instance, in a cattle barn, many changes of air per hour cause almost complete drying of the litter and floor without constant cleaning. The elimination of moisture tends to improve the overall health and rate of growth of the cattle confined in the building.

Likewise, it is very desirable to change the air in hospitals many times in order to exhaust moisture-laden air which may carry a good number of undesirable germs.

It has been found, according to the present invention, that the air within a building may be changed many times per hour, in the order of 10 to 50 times per hour, while minimizing the amount of heat that must be added, even though the exterior ambient temperatures may be well below freezing. The intake air is moved along and heated adjacent a heat exchanger panel which obtains heat from the exhaust air being removed from the building. In the event the outside air is warmer than exhausting air, the outside air is cooled along the heat exchanger panel and the exhausting air carries the heat away.

Because the exhaust air may flow into the exterior atmosphere wherein ambient temperatures may be considerably below zero, freezing in the exhaust air ducts may occur, and the heat provided by the moving air will loosen and cause ice accumulated in the exhaust duct to crack off and fall out. Although the air may move by convection currents, it is found desirable to move the air with blowers or fans.

These and other objects and advantages of my invention will more fully appear from the following description made in connection with accompanying drawing, wherein like reference characters refer to the same or similar parts throughout the several views, and in which:

In the Drawings:

FIG. 2 is a somewhat enlarged section view taken through the building illustrated in FIG. 1.

FIG. 3 is an enlarged detail section view taken approximately at 3-3 in FIG. 2.

FIG. 5 is a greatly enlarged detail section view of a modified form of the invention.

FIG. 6 is an enlarged detail section view taken approximately at 6-6 in FIG. 5.

Figure 1:
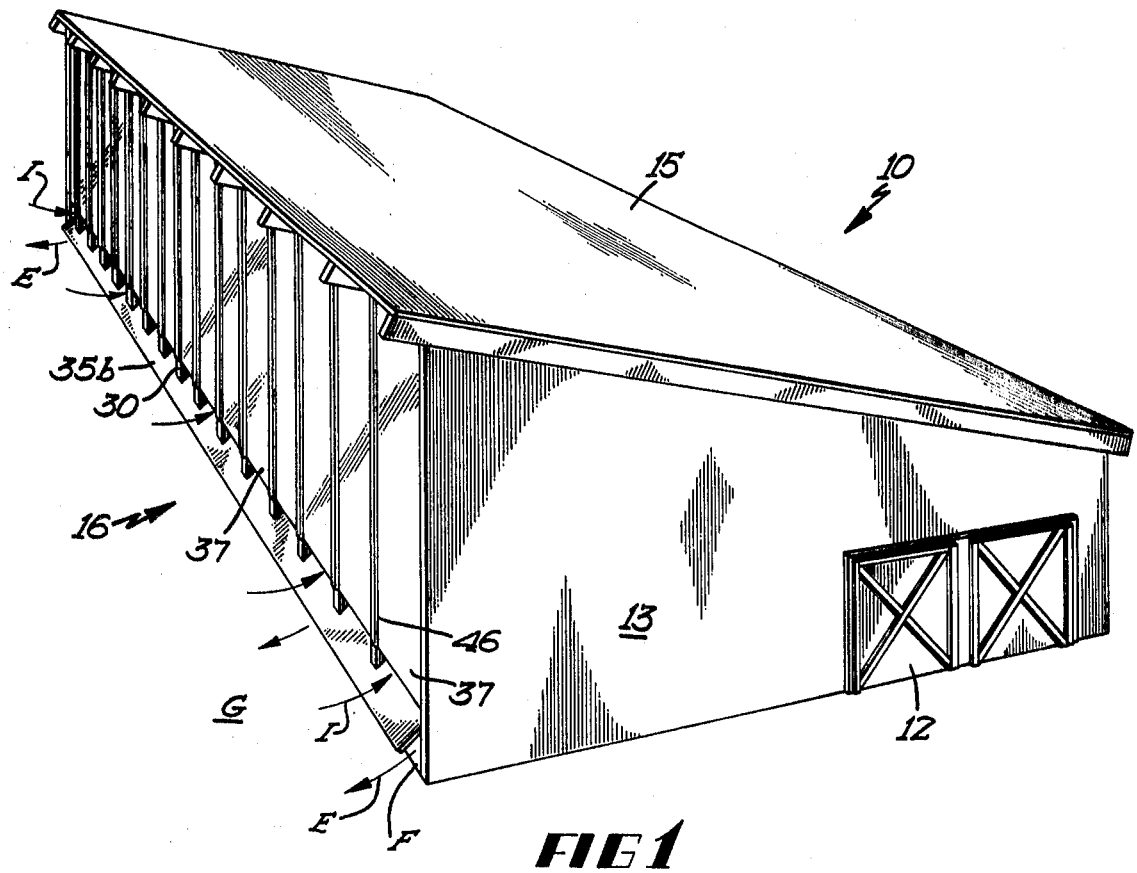
FIG. 1 is a perspective view of a typical building incorporating the present invention.
Figure 4:
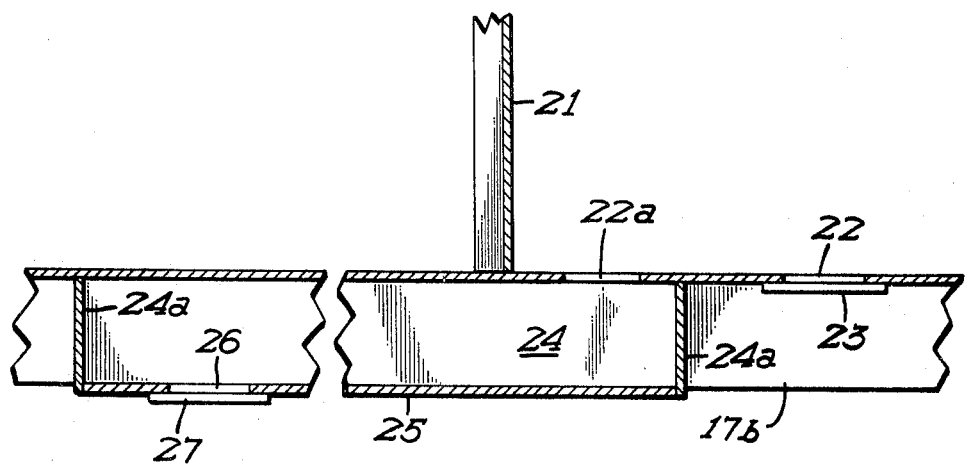
FIG. 4 is an enlarged detailed section view taken approximately at 4-4 in FIG. 3.

One form of the invention is shown in the drawings and is described herein.

The building 10 in this instance comprises a cattle barn and is used for confining beef cattle during the cold months throughout the year. The cattle spaces or areas 11 are open and unobstructed, without stanchions or other confining pens or the like. The cattle area is accessible through doors 12 which are preferably tight fitting. The end walls 13 and the rear wall 14, as well as the roof structure 15, are well insulated to preserve heat within the building.

The wall structure 16 discharges exhaust air and receives intake air. The interior of the building has the usual structural posts 17a, joists 17b, and this building has a decking or floor 18 over the joists 17b so as to define a large plenum chamber 19 above the decking. A fan room 20 is also defined above the decking and is separated from the plenum by the upright wall 21. It will be noted that the decking 18 has a plurality of air exhaust ports 22 therein which are equally spaced from each other and which are provided with adjustable louver structures 23 of any suitable design so as to permit varying the volume or relative volumes of air moving through the various ports 22. The ports 22 extend throughout the length of the building, and across the width so that air from the plenum 19 is directed, substantially equal, or otherwise as desired, into the usable spaces 11.

In order to assure that air is exhausted into the cattle areas 11, immediately beneath the fan room, ducts 24 are defined between certain of the joists 17b by applying an underlying panel 25 which is also provided with an air port 26 having an adjustable louver structure 27 for varying the airflow therethrough. The ducts 24 have ends 24a to confine the flow of air downwardly through the ports 26. Of course, inlet ports 22a are provided in the decking 18 to supply air into these ducts 24 for delivery of air to the ports 26.

The wall structure 16 has upright studs or posts 30 in suitable footings in the ground, and an inner sheeting 31 of plywood or boards is affixed on the inner edges of the posts 30.

The wall structure 16 incorporates an exhaust duct 32, and an intake duct 33. These ducts 32 and 33 extend substantially throughout the entire length of the building, being only interrupted by the upright posts, or studs 30, but it will be understood that air is being exhausted all along the length of the wall structure 16 and air is being taken in all along the wall structure. The intake air is indicated by arrows I and the exhaust air is indicated by arrows E.

The exhaust duct 32 is defined between the sheeting 31 and a heat exchanging conductive metal panel 35, which, in this disclosure, is actually constructed of corrugated aluminum roofing which is substantially the correct width as to extend between adjacent studs or posts 30. The sheeting is fastened as by nails to upright furring strips or blocks 36 which are attached to each of the upright studs 30.

The duct 33 is formed with the aluminum heat conductive sheet material 35 forming one side of the duct, and the other side of the duct is formed of a panel 37 of fiberboard or plywood, or similar exterior material, nailed to the upright posts or studs 30.

The upper end of the exhaust duct 32 opens to the interior of the building and is particularly connected to a supply duct 40 which is formed adjacent the sheeting 31 and a false wall 42 which is anchored on upright studs 42a, and fastened to the joists 17b and the rafters in the roof. A bridging or closure plate 35a bridges across between the top edges of sheet metal panels 35 and the false wall 42 so as to connect the upper inlet end of the exhaust duct 32 with the upper end of the supply duct 40. The lower end of the supply duct 40 opens into the animal spaces 11, between the joists 17b. It will be noted that the decking 18 is terminated at the side of the duct 40 so that the exhaust air may move freely upwardly into the duct 40 from the animal spaces 11. It will be recognized that all of the exhaust air E comes from the animal spaces 11 where the temperature and moisture content are rather high.

Means are provided for periodically closing off individual fresh air ducts 33 for the purpose of temporarily preventing the cooling of the heat exchanging panel 35 and to permit the warming of the panel 35 by the exhaust air E so that any accumulation of ice on the heat exchanger panel 35 will be allowed to loosen and crack off and fall downwardly to the exterior, adjacent the bottom of the posts or studs 30. In the form shown, such means for closing off the air in each of the ducts 33 comprises an air valve 38 hinged at 38b for alternately opening and closing the upper end 38a of the duct 33. The air valves 38 are located between each of the posts or studs 30 and are operated by electric motors or solenoids 39 connected to the air valves by suitable linkage. Only one or two of the air valves 38 are closed at any one time so as to prevent interference with the supply of air to the plenum 20. A conventional stopper or sequency switch is used to successively operate and shut down the motors or solenoids 39. Each of the ducts 33 is thereby closed for at least a few minutes every few hours to allow the ice to be cracked off. Of course, the frequency and length of time of closing each valve 38 may be varied as conditions require.

In the use of this invention, the fans 20a are operated at a rate adequate to change the air in the building the number of times desired. The actual volume of air to be moved can be changed, according to the use to which the building is being put. The air may change in the building 10 times per hour, or it may change 50 times per hour.

As the air is exhausted through the duct 32, a substantial portion of the heat contained in the moisture-laden air is recovered and returned to the building. The warm air moving downwardly in the exhaust duct 32 transfers heat through the conductive aluminum sheeting 35 so as to warm the intake air which is flowing upwardly through the intake duct 30. As the moisture-laden exhaust air is moving downwardly through the exhaust duct, the reduction in the temperature of this air condenses out a substantial portion of the moisture carried by the air and this condensation also adds heat to the air for transfer through the conductive aluminum sheeting 35 to the intake air in the duct 33. It has been determined that heat exchange is approximately 80 percent efficient as between the exhaust and intake air.

As the moisture condenses out of the exhaust air in the duct 32, ice may accumulate on the aluminum sheeting 35. In order to avoid adverse effects of this accumulation of ice, the air valve 38 will periodically be operated so as to close off the duct 33. When the movement of air in the duct 33 is stopped, the warm exhaust air E moving downwardly through the duct 32 will heat the conductive sheeting 35 so as to loosen the ice and allow it to crack off and fall downwardly to the area of the footing F. Of course, the valve 38 will permit intake air to flow through the duct 33 most of the time, but periodically and for short periods, the air will be stopped so as to permit removal of ice from the heat conductive sheet 35 as necessary.

In the event the exterior air is warmer than the air within the building 10, the heat exchange between the exhausting air in duct 32 and in duct 33 will effect a cooling of the intake air and a corresponding warming of the exhaust air. In this instance, the exchange of heat between the exhaust and intake air minimizes the degree of cooling which must be effected to maintain a predetermined temperature within the building.

It may be desirable to increase the cooling effect on the incoming air by additionally cooling the conductive aluminum sheeting 35, as by running cold water down this sheeting to absorb the heat from the intake air.

It will further be understood that the wall 16 could be prefabricated in sections and simply be inserted in preassembled panels into the sidewall of a building.

It may also be desirable, in the wall 16, to provide for initial filtering of the air as it enters or passes through the fresh air duct 33. It will be seen that a divider panel 35b extends obliquely outwardly and downwardly from the lower edge of panel 35 so as to clearly segregate the intake air from the exhaust air.

In the form of the invention shown in FIGS. 5 and 6, solar heat is used in preheating the intake air. In the construction illustrated in FIGS. 5 and 6, the wall construction 16' is similar to that illustrated in FIG. 2, and incorporates the air ducts 32, 33 and 40. The panels which define these air passages are identical to that previously disclosed with the exception of panel 37' which is preferably constructed of a wallboard or fiberboard, the outer surface 37a' of which has a black color for absorbing solar heat.

The wall 16' also has an additional paneling 44 of solar heat and infrared transmissible material such as glass or one of the newer plastic materials which transmit light and solar heat and infrared with somewhat greater efficiency. The panel 44 is fastened to the outer edge of the upright posts or studs 30 and the fiberboard 37' is adjusted somewhat inwardly so as to define a solar heating duct 45 between the transparent paneling 44 and the heat absorbing paneling 37'. It will be noted that the transparent paneling 44 is terminated at its upper edge in spaced relation with the roof so as to open the upper end of the solar heating duct 45 to the atmosphere, and the lower edge of the paneling is spaced above the footings F and is connected to the lower edge of the paneling 35 as by a bridging or closure plate 44a. The solar heating duct 45 is thereby connected to the intake duct 33.

The intake air which enters the solar heating duct 45 at the upper end will absorb heat from the black front surface 37a' of the wallboard 37 so that the air entering the intake duct 33 has a temperature well in excess of the ambient temperature at the exterior of the building. This heated air moves upwardly along the heat transmissible panel 35 so as to continuously loosen any ice that may have built up on it as illustrated at C in FIG. 6. The solar heated air entering the intake duct 33 gradually loses its heat through the heat transmissible panel 35 as the air progresses upwardly in the duct 33, and therefore it will be understood that any ice accumulated on the panel 35 will be loosened first at the lowest portion of the panel 35 and then the ice at progressively higher locations on the panel 35 will be loosened. Because the ice loosens first at the lower portion of the panel 35 and then the duct 32, this ice will crack and fall off into the space beneath the bridging panel 44a, and obstructing the exhaust duct 32 is thereby avoided. Although the heating of air in the duct 35 occurs only during daylight hours, it has not been found that the amount of ice will materially and adversely affect the operation of the invention.

Of course, it will be understood that the icing occurs only under extreme conditions, but for the most part, the air which is heated in the solar heating duct 45 is carried directly into the building without substantial heat loss, and, in fact, the air in the intake duct 33 is ordinarily heated very materially by the transfer of the heat through the panel 35 from the exhaust air in the duct 32. As previously pointed out, the exhaust air normally has a considerable amount of heat to transfer to the intake air in the duct 33, and in addition, the substantial quantity of moisture carried in the exhaust air is condensed during the cooling and the condensation of this air also adds further heat to be transferred through the panel 35 to the intake air. As a result, the transfer of heat from the exhaust air to the intake air is really quite efficient.

It should be understood that the transparent panel 44 will extend along the entire length of the building and may be fastened at the upright studs or posts 30 by stripping 46.

Alternatively, the solar heat absorbing paneling 37' may be perforated or porous, facilitating drawing of air through this porous panel to effect the heating thereof. In the use of such a porous panel, the transparent panel 44 could either be used or eliminated. Such heat absorbing perforated or porous paneling may either be opaque or somewhat translucent; and the lower end of the intake duct 33 would be closed so as to draw all the air in through the perforated heat absorbing panel so that the air passing through it would absorb the heat collected from the sun.

It will, of course, be understood that various changes may be made in the form, details, arrangement and proportions of the various parts without departing from the scope of my invention.

What I claim is:

1. An exterior wall structure facilitating rapid air changes in a building, comprising an upright exhaust duct in the wall and opening at one end within the building to receive air to be exhausted, and said duct opening at the opposite end to the exterior of the building, said duct having a heat conductive panel forming one side thereof, an upright intake duct in the wall and including said heat conductive panel as one side thereof to transfer heat from the exhaust air to the intake air, one end of said intake duct opening to the exterior of the building for receiving fresh air, and the other end of said intake duct opening into said building for supplying such fresh air into the building after the fresh air has been heated along said heat conductive panel to return heat from the exhaust air into the building.

2. The wall structure according to claim 1 and said exhaust duct and said intake duct disposed in juxtaposition with each other, separated by said heat conductive panel, the delivery end of said intake duct being adjacent the receiving end of said exhaust duct whereby the exhaust and intake air flow in opposite directions in said ducts and along said heat conductive panel.

3. The invention set forth in claim 2 and the upper end of said exhaust duct opening into the interior of the building whereby exhaust air flows downwardly through said exhaust duct.

4. The exterior wall structure according to claim 3 and including air controlling valve means closing the portion of said intake duct along said heat conductive panel and supplying fresh air directly into the building, whereby to permit the warm exhaust air to heat the heat conductive panel and crack off any accumulation of ice that may have formed.

5. The exterior wall structure according to claim 4 and there being a large and unobstructed space adjacent the lower discharge end of said exhaust duct to receive ice cracking out of said exhaust duct and falling into said space.

6. An exterior wall structure facilitating rapid air changes in a building, comprising an upright exhaust duct in the wall and opening at its upper end and within the building to receive air to be exhausted, the lower end of the duct opening to the exterior, the duct having a heat conductive panel forming one side thereof, an upright intake duct in the wall and including said heat conductive panel as one side thereof to transfer heat from exhaust air to the intake air, the upper end of the intake duct communicating with the building interior to deliver air thereto, the lower end of the intake duct receiving air for delivery to the building interior, another side of the intake duct comprising a solar heat absorption panel exposed to the exterior to receive heat and infrared radiation and said panel transmitting absorbed heat to the intake air, and means directing air from without the building along said solar heat absorption panel for heating and to said intake duct.

7. The exterior wall structure according to claim 6 and said air directing means comprising a solar heating duct with said solar heat and infrared absorption panel comprising one side thereof, the opposite side of solar heating duct comprising a solar heat and infrared transmissive panel spaced from and confronting the absorption panel to permit solar heating of the panel and to confine airflow along the surface thereof.

8. The exterior wall structure according to claim 7 wherein said solar heating duct and the intake duct extend along each other, said absorption panel also forming one side of said intake duct.

9. The exterior wall structure according to claim 6 and said solar heat absorption panel being perforated to permit passage of air therethrough and into said intake duct, the heat absorbed by said panel being transferred to the air passing through the perforations and into the intake duct.